United States Patent
Wang et al.

(10) Patent No.: US 11,570,123 B2
(45) Date of Patent: Jan. 31, 2023

(54) GENERATING, AT LEAST IN PART, AND/OR RECEIVING, AT LEAST IN PART, AT LEAST ONE REQUEST

(71) Applicant: Intel Corporation, Santa Clara, CA (US)

(72) Inventors: Ren Wang, Portland, OR (US); Tsung-Yuan C. Tai, Portland, OR (US); Jr-Shian Tsai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 35 days.

(21) Appl. No.: 17/067,564

(22) Filed: Oct. 9, 2020

(65) Prior Publication Data

US 2021/0099398 A1    Apr. 1, 2021

Related U.S. Application Data

(60) Continuation of application No. 16/410,442, filed on May 13, 2019, now Pat. No. 10,805,229, which is a
(Continued)

(51) Int. Cl.
*H04L 67/145* (2022.01)
*H04L 47/74* (2022.01)
(Continued)

(52) U.S. Cl.
CPC .......... *H04L 47/748* (2013.01); *H04L 1/0018* (2013.01); *H04L 1/1835* (2013.01);
(Continued)

(58) Field of Classification Search
CPC . H04L 27/2666; H04L 67/145; H04L 1/0018; H04W 28/0908; H04W 28/0236
See application file for complete search history.

(56) References Cited

U.S. PATENT DOCUMENTS

| 5,560,022 A | 9/1996 | Dunstan et al. |
| 5,802,305 A | 9/1998 | McKaughan et al. |

(Continued)

FOREIGN PATENT DOCUMENTS

| CN | 1497454 A | 5/2004 |
| CN | 1809013 A | 7/2006 |

(Continued)

OTHER PUBLICATIONS

"Broad Market Potential", IEEE interim meeting, Geneva, CH, May 2007, pp. 1-5.
(Continued)

*Primary Examiner* — Salvador E Rivas
(74) *Attorney, Agent, or Firm* — Compass IP Law PC

(57) ABSTRACT

In an embodiment, an apparatus is provided that may include circuitry to generate, at least in part, and/or receive, at least in part, at least one request that at least one network node generate, at least in part, information. The information may be to permit selection, at least in part, of (1) at least one power consumption state of the at least one network node, and (2) at least one time period. The at least one time period may be to elapse, after receipt by at least one other network node of at least one packet, prior to requesting at least one change in the at least one power consumption state. The at least one packet may be to be transmitted to the at least one network node. Of course, many alternatives, modifications, and variations are possible without departing from this embodiment.

24 Claims, 3 Drawing Sheets

Related U.S. Application Data division of application No. 13/540,246, filed on Jul. 2, 2012, now Pat. No. 10,291,542, which is a continuation of application No. 12/210,016, filed on Sep. 12, 2008, now Pat. No. 8,213,303.

(51) Int. Cl.

| | | |
|---|---|---|
| *H04L 47/722* | (2022.01) | |
| *H04N 1/333* | (2006.01) | |
| *H04L 1/18* | (2006.01) | |
| *H04L 47/30* | (2022.01) | |
| *H04L 12/12* | (2006.01) | |
| *H04L 67/125* | (2022.01) | |
| *H04L 1/00* | (2006.01) | |
| *H04W 28/08* | (2009.01) | |
| *H04L 67/59* | (2022.01) | |
| *H04L 27/26* | (2006.01) | |
| *H04W 28/02* | (2009.01) | |

(52) U.S. Cl.
CPC .............. *H04L 12/12* (2013.01); *H04L 47/30* (2013.01); *H04L 47/722* (2013.01); *H04L 67/125* (2013.01); *H04L 67/145* (2013.01); *H04N 1/33376* (2013.01); *H04W 28/0908* (2020.05); *H04L 27/2666* (2013.01); *H04L 67/59* (2022.05); *H04W 28/0236* (2013.01); *Y02D 30/50* (2020.08)

(56) References Cited

U.S. PATENT DOCUMENTS

| | | | |
|---|---|---|---|
| 5,910,944 A | 6/1999 | Callicotte et al. | |
| 6,292,831 B1 | 9/2001 | Cheng | |
| 6,377,512 B1 | 4/2002 | Hamamoto et al. | |
| 6,408,006 B1* | 6/2002 | Wolff ................. H04L 47/2408 |
| | | | 370/395.42 |
| 6,408,351 B1 | 6/2002 | Hamdi et al. | |
| 6,463,542 B1 | 10/2002 | Yu et al. | |
| 6,601,178 B1 | 7/2003 | Gulick | |
| 6,934,914 B1 | 8/2005 | Vittal et al. | |
| 7,039,430 B2 | 5/2006 | Kang et al. | |
| 7,212,786 B2 | 5/2007 | Kojima et al. | |
| 7,269,629 B2 | 9/2007 | Zmudzinski et al. | |
| 7,313,712 B2 | 12/2007 | Cherukuri et al. | |
| 7,320,080 B2 | 1/2008 | Solomon et al. | |
| 7,346,715 B2 | 3/2008 | Hatano | |
| 7,356,561 B2 | 4/2008 | Balachandran et al. | |
| 7,426,597 B1 | 9/2008 | Tsu et al. | |
| 7,564,812 B1 | 7/2009 | Elliott | |
| 7,573,940 B2 | 8/2009 | Connor et al. | |
| 7,577,857 B1 | 8/2009 | Henderson et al. | |
| 7,813,296 B2 | 10/2010 | Lindoff et al. | |
| 7,869,360 B2 | 1/2011 | Shi | |
| 7,925,908 B2 | 4/2011 | Kim | |
| 8,145,920 B2 | 3/2012 | Tsai et al. | |
| 8,155,597 B2 | 4/2012 | Nabar et al. | |
| 8,312,307 B2 | 11/2012 | Hays | |
| 9,454,204 B2 | 9/2016 | Wertheimer et al. | |
| 10,386,908 B2 | 8/2019 | Wertheimer et al. | |
| 10,860,079 B2 | 12/2020 | Wertheimer et al. | |
| 11,340,681 B2 | 5/2022 | Wertheimer et al. | |
| 2002/0004840 A1 | 1/2002 | Harumoto et al. | |
| 2002/0147816 A1 | 10/2002 | Hlasny | |
| 2002/0196736 A1 | 12/2002 | Jin | |
| 2003/0126494 A1 | 7/2003 | Strasser | |
| 2003/0196137 A1 | 10/2003 | Ahmad et al. | |
| 2004/0025063 A1 | 2/2004 | Riley | |
| 2004/0029622 A1 | 2/2004 | Laroia et al. | |
| 2004/0073723 A1 | 4/2004 | Hatano | |
| 2004/0106431 A1 | 6/2004 | Laroia et al. | |
| 2004/0128387 A1 | 7/2004 | Chin et al. | |
| 2004/0264396 A1 | 12/2004 | Ginzburg et al. | |
| 2005/0003836 A1 | 1/2005 | Inoue et al. | |
| 2005/0018624 A1 | 1/2005 | Meier et al. | |
| 2005/0063302 A1 | 3/2005 | Samuels et al. | |
| 2005/0097378 A1 | 5/2005 | Hwang | |
| 2005/0128990 A1 | 6/2005 | Eom et al. | |
| 2005/0147082 A1 | 7/2005 | Keddy et al. | |
| 2005/0190709 A1 | 9/2005 | Ferchland et al. | |
| 2005/0195859 A1 | 9/2005 | Mahany | |
| 2005/0204072 A1 | 9/2005 | Nakagawa | |
| 2005/0208958 A1 | 9/2005 | Bahl et al. | |
| 2005/0238035 A1 | 10/2005 | Riley | |
| 2005/0243795 A1 | 11/2005 | Kim et al. | |
| 2005/0268137 A1 | 12/2005 | Pettey | |
| 2006/0164774 A1 | 7/2006 | Herbold et al. | |
| 2006/0184664 A1* | 8/2006 | Jung ..................... H04L 47/193 |
| | | | 709/224 |
| 2006/0239282 A1 | 10/2006 | Dick et al. | |
| 2006/0253735 A1 | 11/2006 | Kwak et al. | |
| 2007/0086451 A1 | 4/2007 | Sato et al. | |
| 2007/0116030 A1* | 5/2007 | Lundby ................. H04L 1/1858 |
| | | | 370/252 |
| 2007/0171850 A1 | 7/2007 | Feder et al. | |
| 2007/0245076 A1 | 10/2007 | Chang et al. | |
| 2007/0253399 A1 | 11/2007 | Deshpande et al. | |
| 2008/0005636 A1 | 1/2008 | Conrad et al. | |
| 2008/0159183 A1* | 7/2008 | Lindoff ................. H04L 1/1854 |
| | | | 370/278 |
| 2009/0034479 A1 | 2/2009 | Wakayama et al. | |
| 2009/0049320 A1 | 2/2009 | Dawkins et al. | |
| 2009/0074040 A1 | 3/2009 | Lida et al. | |
| 2009/0164821 A1 | 6/2009 | Drescher | |
| 2009/0196212 A1 | 8/2009 | Wentink | |
| 2009/0225792 A1 | 9/2009 | Benjes | |
| 2009/0249096 A1 | 10/2009 | Conner et al. | |
| 2010/0099358 A1 | 4/2010 | Kumar et al. | |
| 2010/0128738 A1 | 5/2010 | Barrass | |
| 2010/0165846 A1 | 7/2010 | Yamaguchi et al. | |
| 2010/0262848 A1 | 10/2010 | Bobrek et al. | |
| 2011/0191608 A1 | 8/2011 | Vetteth | |
| 2012/0233481 A1 | 9/2012 | Henttonen et al. | |
| 2013/0080816 A1 | 3/2013 | Johnson et al. | |
| 2013/0268783 A1 | 10/2013 | Diab et al. | |
| 2015/0046731 A1 | 2/2015 | Hays | |
| 2016/0381638 A1 | 12/2016 | Min et al. | |

FOREIGN PATENT DOCUMENTS

| | | |
|---|---|---|
| CN | 1976297 A | 6/2007 |
| CN | 1747463 B | 12/2011 |
| EP | 1783951 A2 | 5/2007 |
| JP | 2002026795 A | 1/2002 |
| JP | 2004118746 A | 4/2004 |
| JP | 2005250671 A | 9/2005 |
| JP | 2005328439 A | 11/2005 |
| JP | 2006148749 A | 6/2006 |
| JP | 2006277332 A | 10/2006 |
| JP | 2008059577 A | 3/2008 |
| JP | 2008167224 A | 7/2008 |
| WO | 03060716 A1 | 7/2003 |
| WO | 2007049203 A3 | 8/2007 |
| WO | 2008035600 A1 | 3/2008 |
| WO | 2009061880 A3 | 7/2009 |
| WO | 2010030768 A3 | 7/2010 |

OTHER PUBLICATIONS

"Chou et al., ""EEE Compatible MI/GMII Interface""", IEEE 802.3az Task Force Interim Meeting, May 2008, pp. 1-16."
"Chou et al., ""Feasibility of Asymmetrical Low-Power Idle 1000Base-T""", IEEE 802.3az Task Force InterimMeeting, Jan. 2008, pp. 1-14."
"Chou et al., "Proposal of Low-Power Idle 100Base-TX", IEEE 802.3az Task Force Interim Meeting, Jan. 2008, pp. 1-26."
"Chou, Joseph, ""Corner cases and Comments on EEE Clause 40""", IEEE 802.3az Task Force Interim Meeting, Sep. 2008, pp. 1-18."
"Chou, Joseph, ""Making EEE GPHY more robust on corner cases""", IEEE 802.3az Task Force Plenary Meeting, Nov. 2008, pp. 1-14."

(56) References Cited

OTHER PUBLICATIONS

"Diab, Wael W., ""802.3az Task Force Layer 2 Ad-Hoc Report"", IEEE 802.3az Layer 2 Ad-Hoc Report on PlenaryMeeting, Mar. 10, 2009, pp. 1-13."
"Project Authorization Request (PAR) Process", May 31, 2007, IEEE standard information technology, 3 pages.
"Tellado et al., ""Alert signal Comments for 10GBASE-T Eee"", Energy Efficient Ethernet (802.3az), Dallas, US, Nov. 2008, pp. 1-9."
10GBASE-T Power Budget Summary, Tehuti Networks, Mar. 2007, pp. 1-3.
Agarwal et al., "Dynamic Power Management using on Demand Paging for Networked Embedded System", Proceedings of the 2005 Asia and South Pacific Design Automation Conference, vol. 2, Jan. 18-21, 2005, 5 pages.
Barnette et al., "Speed Switching without Communication Interruption", Vitesse, Prepared for the IEEE 802.3 Study Group, pp. 1-15.
Barrass, Hugh, "EEE control protocol proposal", IEEE 802.3az EEE Task Force, Atlanta, Georgia, Nov. 2007, pp. 1-11.
Barrass, Hugh, "EEE Exchange of Management Information", IEEE 802.3az EEE Task Force, Vancouver, British Columbia, Mar. 2009, pp. 1-11.
Barrass, Hugh, "Energy Efficient Ethernet Beyond the PHY", Power savings in networked systems, IEEE 802.3 Energy Efficient Ethernet, Geneva, Switzerland, May 2007, pp. 1-12.
Barrass, Hugh, "Energy Efficient Ethernet Objectives & 5 Criteria", A strawman to spur discussion and drive towards consensus, IEEE 802.3 Energy Efficient Ethernet, Monterey, CA, Jan. 2007, pp. 1-12.
Barrass, Hugh, "Energy Efficient Ethernet Setting the bar", A system developer's view of new PHY proposals, IEEE 802.3 Energy Efficient Ethernet, Orlando, Florida, Mar. 2007, pp. 1-7.
Barrass, Hugh, "Energy Efficient Ethernet Transparent—not invisible", Some important considerations for management of EEE, IEEE 802.3 Energy Efficient Ethernet, San Francisco, Jul. 2007, pp. 1-8.
Barrass, Hugh, EEE Backplane Architecture, IEEE 802.3az EEE Task Force, Vancouver, British Columbia, Mar. 2009, pp. 1-10.
Baumer et al., "A "Subset PHY" Approach for 10GBASE-KR Energy Efficient Ethernet", IEEE 802.3az, Portland, Oregon, Jan. 2008, pp. 1-7.
Bennett et al., "Energy Efficient Ethernet Study Group Meeting Minutes", Jan. 22, 2008, 6 pages.
Bennett et al., "IEEE802.3az task force meeting", IEEE 802 Plenary, Orlando, FL, Mar. 18, 2008, 15 pages.
Bennett et al., Minutes of Meeting held on Jan. 13, 2009, 7 pages.
Bennett et al., Minutes of Meeting held on Jul. 15, 2008, 6 pages.
Bennett et al., Minutes of Meeting held on Mar. 10, 2009, 5 pages.
Bennett et al., Minutes of Meeting held on May 13, 2008, 8 pages.
Bennett et al., Minutes of Meeting held on Nov. 11, 2008, 5 pages.
Bennett et al., Minutes of Meeting held on Sep. 16, 2008, 5 pages.
Bennett, Mike, "Energy Efficient Ethernet and 802.1", IEEE 802.3az Energy Efficient Ethernet Task Force, Feb. 15, 2008, pp. 1-9.
Bennett, Mike, "Energy Efficient Ethernet Study Group Meeting Minutes", Jul. 17, 2007, 7 pages.
Bennett, Mike, "Energy Efficient Ethernet Study Group Meeting Minutes", May 29, 2007, 12 pages.
Bennett, Mike, "Energy Efficient Ethernet Study Group Meeting Minutes", Sep. 11, 2007, 5 pages.
Bennett, Mike, "IEEE 802.3 Energy Efficient Ethernet Study Group", Agenda and General Information, Geneva, Switzerland, May 2007, pp. 1-31.
Bennett, Mike, "IEEE 802.3 Energy Efficient Ethernet Study Group", Agenda and General Information, Monterey, CA, Jan. 2007, pp. 1-25.
Bennett, Mike, "IEEE 802.3 Energy Efficient Ethernet Study Group", Agenda and General Information, Orlando, FL, Mar. 2007, pp. 1-26.
Bennett, Mike, "IEEE 802.3 Energy Efficient Ethernet Study Group", Agenda and General information, Ottawa, ON, Apr. 2007, pp. 1-27.
Bennett, Mike, "IEEE 802.3 Energy Efficient Ethernet Study Group", Agenda and general information, San Francisco, California, Jul. 2007, pp. 1-31.
Bennett, Mike, "IEEE 802.3 Energy Efficient Ethernet Study Group", Server Bandwidth Utilization plots, Orlando, FL, Mar. 2007, pp. 1-13.
Bennett, Mike, "IEEE 802.3az Energy Efficient Ethernet", Agenda and general information, Munich, Germany, May 2008, pp. 1-28.
Bennett, Mike, "IEEE 802.3az Energy Efficient Ethernet", Open Questions for the Task Force, IEEE Plenary Meeting, Atlanta, GA, Nov. 2007, 13 pages.
Bennett, Mike, "IEEE 802.3az Energy Efficient Ethernet", Task Force Update, Presented to the P802.3ba Task Force, IEEE Plenary Meeting, Denver, CO, Jul. 16, 2008, pp. 1-19.
Booth, Brad, "802.3 Standards Development Lessons Learned", AMCC, Jan. 2007, pp. 1-19.
Booth, Brad, "Backplane Ethernet Low-Power Idle", AMCC, May 2008, 14 pages.
Booth, Brad, "Supporting Legacy Devices", AMCC, IEEE 802.3az Interim Meeting, Jan. 2008, 10 pages.
Carlson et al., "802.3az Jan. 9 Interim: LLDP's Use in EEE", IEEE P802.3az EEE, Jan. 2009, pp. 1-31.
Carlson et al., "Energy Efficient Ethernet Another Look at the Objectives", IEEE 802.3 EEE SG, Geneva, Switzerland, May 2007, pp. 1-6.
Chadha et al., "10BT Amplitude Optimization", Vitesse, IEEE 802.3 EEE SG, Interim Meeting, Apr. 2007, pp. 1-5.
Chadha et al., "Feasibility of 1000-Base-T RPS Restart", Vitesse, IEEE 802.3 EEE SG, Interim Meeting, Apr. 2007, pp. 1-9.
Chadha, Mandeep, "Cat5 Twisted Pair Model for "Green" 10BASE-T", IEEE 802.3az Interim Meeting, Jan. 2008, pp. 1-22.
Chadha, Mandeep, "Re-optimization of Cat5 Twisted Pair Model for 10BASE-Te", IEEE 802.3az Interim Meeting, Sep. 2008, pp. 1-28.
Chadha, Mandeep, "Transmit Amplitude Reduction "Green-T": The path to a "greener" 10BASE-T", IEEE 802.3az Interim Meeting, Jan. 2008, pp. 1-11.
Chalupsky et al., "A Brief Tutorial on Power Management in Computer Systems", Intel Corporation, Mar. 13, 2007, pp. 1-28.
Chou et al., "A pathway to Asymmetric EEE GPHY", IEEE 802.3az Task Force Plenary Meeting, Mar. 2008, pp. 1-23.
Chou et al., "EEE Compatible 100Base-TX", IEEE 802.3az Task Force Interim Meeting, May 2008, pp. 1-25.
Chou et al., Low-Power Idle based EEE 100Base-TV, IEEE 802.3az Task Force Interim Meeting, Mar. 2008, pp. 1-18.
Chou, Joseph, "Response to comments on Clause 24 of Draft 1p1", IEEE 802.3az Task Force Interim Meeting, Jan. 2009, pp. 1-8.
Chou, Joseph, "Timing Parameters of LPI 100BASE-TX", IEEE 802.3az Task Force Plenary Meeting, Jul. 2008, pp. 1-14.
Christensen, Ken, "Rapid PHY Selection (RPS): A Performance Evaluation of Control Policies", IEEE 802.3 EEE Study Croup, Monterey, CA, Jan. 15, 2007, pp. 1-45.
Christensen, Ken, "Rapid PHY Selection (RPS): Emulation and Experiments using PAUSE", IEEE 802.3 EEE Study Group, Orlando, FL, Mar. 13, 2007, pp. 1-16.
Conner et al., U.S. Appl. No. 11/296,958, titled "Data Transmission At Efficient Data Rates", filed Dec. 7, 2005, 33 pages.
Conner et al., U.S. Appl. No. 12/484,028, titled "Energy Efficient Data Transmission", filed Jun. 12, 2009, 37 pages.
Diab et al., "Subset PHY: Cost and Power Analysis", IEEE 802.3 EEESG, Broadcom, Seoul, South Korea, Sep. 2007, 10 pages.
Diab, Wael W., "Discussion with 802.1 Regarding 802.3at/802.3az use of LLDP", IEEE 802.3 Joint Discussion with 802.1, Denver, Jul. 2008, pp. 1-15.
Diab, Wael W., "Energy Efficient Ethernet and 802.1", IEEE 802 Plenary, Atlanta, GA, Nov. 16, 2007, 23 pages.
Dietz, Bryan, "802.3az D1.1 Clause 22.2.1 Transmit Deferral during LPI",802.3az Interim Meeting, Jan. 6, 2009, pp. 1-6.
Diminico, Chris, "Physical Layer Considerations for Link Speed Transitions", EEE Study Group, pp. 1-8.
Dove, Dan, "Energy Efficient Ethernet Switching Perspective", IEEE 802.3az Interim Meeting, Jan. 2008, pp. 1-14.

(56) References Cited

OTHER PUBLICATIONS

Dove, Dan, "Energy Efficient Ethernet Switching Perspective", IEEE 802.3az Interim Meeting, May 2008, pp. 1-19.
Dove, Dan, "Energy Efficient Ethernet xxMH Clarifications", IEEE 802.3az Interim Meeting, May 2008, pp. 1-7.
Energy Efficient Ethernet Call-For For-Interest, IEEE 802.3 Working Group, Dallas, TX, Nov. 14, 2006, pp. 1-22.
Energy Efficient Ethernet Call-For-Interest Summary and Motion, IEEE 802.3 Working Group, Dallas, TX, Nov. 16, 2006, pp. 1-8.
Fitzgerald et al., "1000BASE-T PHY Control State Diagram Modifications", IEEE P802.3az Task Force Meeting, New Orleans, LA, Jan. 2009, pp. 1-25.
Frazier et al., "EEE transition time constraints", IEEE 802.3 EEE SG, Geneva, CH, May 29, 2007, pp. 1-9.
Frazier et al., "Technical Open Items for LPI", IEEE 802.3az, Orlando, FL, Mar. 2008, pp. 1-9.
Frazier, Howard, "Review of the 5 Criteria", IEEE 802_3 EEESG, Jan. 2007, 29 pages.
Ganga et al., "End-Stations System Requirements and a proposal for EEE Objectives", IEEE 802.3 EEE SG presentation for Mar. 2007 Plenary, Mar. 9, 2007, pp. 1-12.
Grimwood et al., "Energy Efficient Ethernet 1000BASE-T LPI Timing Parameters Update", IEEE P802.3az Task Force, Denver, CO, Jul. 2008, pp. 1-9.
Grimwood et al., "IEEE P802.3az/D1.0 Clause 40 lpi_mode Encoding", IEEE P802.3az Task Force, Dallas, Nov. 2008, pp. 1-12.
Grimwood et al., "IEEE P802.3az/D1.0 Clause 55 PHY Wake Time Updated", IEEE P802.3az Task Force, Dallas, Nov. 2008, pp. 1-6.
Grimwood et al., "LPI Synchronization Feasibility Questions", IEEE P802.3az Task Force, Orlando, FL, Mar. 2008, pp. 1-12.
Grimwood, Mike, "Energy Efficient Ethernet 1000 Base-T LPI Wait-Quiet Timer", IEEE P802.3az Task Force, Seoul, Sep. 2008, pp. 1-6.
Grow, Bob, "802.1 and Energy Efficient Ethernet", IEEE 802.3 EEESG Interim, Seoul, Korea, Sep. 11, 2007, pp. 1-6.
Haran, Onn, "Applicability of EEE to fiber PHYs", IEEE 802.3 EEE meeting, Seoul, Korea, Sep. 2007, pp. 1-12.
Hays et al., "Active/Idle Toggling with OBASE-x for Energy Efficient Ethernet", IEEE 802.3az Task Force, Nov. 2007, pp. 1-22.
Hays, Robert, "EEE Capabilities Negotiation Proposal Revision 2", IEEE 802.3az Task Force, May 2008, pp. 1-13.
Hays, Robert, "Terminology Proposal for LPI EEE", IEEE 802.3az Task Force, Orlando, FL, Mar. 2008, pp. 1-8.
Hays, Robert, U.S. Appl. No. 11/936,327, titled "Energy Efficient Ethernet Using Active/Idle Toggling", filed Nov. 7, 2007, 31 pages.
Hays, Robert, U.S. Appl. No. 13/647,262, titled "Systems and Methods for Reducing Power Consumption During Communication Between Link Partners", filed Oct. 8, 2012, 26 pages.
Healey et al., "1000BASE-T Low-Power Idle update", IEEE P802.3az Task Force Meeting, Orlando, FL, Mar. 18, 2008, pp. 1-13.
Healey et al., "1000BASE-T Low-Power Idle", IEEE P802.3az Task Force Meeting, Jan. 2008, pp. 1-14.
Healey et al., "1000BASE-T Low-Power Idle", IEEE P802.3az Task Force Meeting, Munich, Germany, May 13, 2008, pp. 1-22.
Healey et al., "Supporting material related to comments against Clause 40", IEEE P802.3az Task Force Meeting, Dallas, TX, Nov. 11, 2008, pp. 1-29.
Healey, Adam, "Observations regarding Energy Efficient 1000BASE-KX", IEEE P802.3az Task Force Meeting, Dallas, TX, Nov. 2008, pp. 1-13.
Healey, Adam, "PHY timers for 1000BASE-T Energy Efficient Ethernet", IEEE P802.3az Task Force Meeting, Vancouver, BC, Mar. 11, 2009, pp. 1-13.
Healey, Adam, "Proposed Modifications to IEEE 802.3az/D0.9 Clause 40", IEEE P802.3az Task Force Meeting, Seoul, KR, Sep. 2008, pp. 1-13.
Holt et al., "Observations and Thoughts on Rate Switching", Mar. 13, 2007, pp. 1-8.
IEEE Energy Efficient Ethernet Study Group, Unapproved Minutes, Orlando, FL, Mar. 13-15, 2006, 10 pages.
IEEE Energy Efficient Ethernet Study Group, Unapproved Minutes, Ottawa, ON, Canada, Apr. 17-18, 2007, 5 pages.
International Preliminary Report on Patentability for PCT Patent Application No. PCT/US2008/082577 dated May 20, 2010, 6 pages.
International Preliminary Report on Patentability received for PCT Patent Application No. PCT/US2009/056498, dated Mar. 24, 2011, 5 pages.
Sedarat, Hossein, "10GBase-T EEE Specifications", Refresh, Quiet, Aquantia, Sep. 2008, pp. 1-14.
Sedarat, Hossein, "Refresh an Option to Ease 10gbase-TLPI Parameter Selection", Aquantia, Sep. 2008, pp. 1-9.
Shih et al., "Physical Layer Driven Protocol and Algorithm Design for Energy-Efficient Wireless Sensor Networks", Proceedings of the 7th annual international conference on Mobile computing and networking; Rome, Italy, Jul. 15-21, 2001, 14 pages.
Supplemental Notice of Allowance Received for U.S. Appl. No. 12/381,811, dated Feb. 9, 2012, 9 pages.
Taich et al., "10GBASE-T Low-Power Idle Proposal", 802.3az Plenary Meeting, May 11, 2008, pp. 1-22.
Taich et al., "Alert Signal Proposal for 10GBASE-T EEE", Energy Efficient Ethernet (802.3az), Seoul, Korea, Sep. 13, 2008, pp. 1-8.
Taich et al., "Alert Signal Proposal for 10GBASE-T EEE", Energy Efficient Ethernet (802.3az), Seoul, Korea, Sep. 2007, pp. 1-7.
Taich et al., "Enhancements to the Low-Power Idle Mode", 802.3az Plenary Meeting, Mar. 12, 2008, pp. 1-14.
Taich, Dimitry, "Annex of the 10GBASE-T EEE Alert Signal Proposal", Energy Efficient Ethernet (802.3az), Seoul, Korea, Sep. 13, 2008, pp. 1-4.
Taich, Dimitry,"Additional Test Modes Definition for 10GBASE-T LPI", Energy Efficient Ethernet (802.3az), Dallas, TX, Nov. 4, 2008, pp. 1-9.
Teener, Michael D., "Joint ITU-T/IEEE Workshop on Carrier-class Ethernet", AudioNideo Bridging for Home Networks, IEEE 802.1 AV Bridging Task Group, Geneva, May 31-Jun. 1, 2007, 35 pages.
Telang et al., "A "Subset PHY" Approach for 10GBASE-KR Energy Efficient Ethernet", IEEE 802.3az, Orlando, Florida, Mar. 2008, 16 pages.
Thompson, Geoff, "0 Base-T Possibilities", Presented to Energy Efficient Ethernet Study Group, Jul. 2007, 10 pages.
Thompson, Geoff, "Another Piece of EEE", An additional requirement for Energy Efficient Ethernet, Atlanta, Nov. 2007, 7 pages.
Thompson, Geoff, "Another View of Low Power IDLE / IDLE Toggle", Version 0.2, Orlando, Mar. 2008, pp. 1-14.
Tidstrom, Rick, "IEEE P802.3az D1.0 Clause 55 State Diagrams updated", Broadcom, IEEE 802.3az Task Force, Nov. 2008, pp. 1-17.
Traber, Mario, "Low-Power Idle for 1000bT", IEEE P802.3az EEE Task-Force, Plenary Meeting, Mar. 2008, pp. 1-21.
Traber, Mario, "The European COC", IEEE P802.3az EEE Task-Force, Plenary Meeting, Mar. 2008, pp. 1-11.
Tsai et al., U.S. Appl. No. 12/208,905, titled "Techniques for Collaborative Power Management for Heterogeneous Networks", filed Sep. 11, 2008, 48 pages.
Tsai et al., U.S. Appl. No. 13/889,472, titled "Techniques for Collaborative Power Management for Heterogeneous Networks", filed May 8, 2013, 16 pages.
Tsai et al., U.S. Appl. No. 60/973,044, titled "Techniques for Collaborative Power Management for Heterogeneous Networks", filed Sep. 17, 2007, 48 pages.
Walewski, Joachim W., "EEE for Real-Time Industrial Ethernet (?)", IEEE 802 plenary meeting, Vancouver, BC, Mar. 10, 2009, pp. 1-15.
Wang et al., "IEEE P802.3az/D1.1 Clause 24 Receive State Diagram Corner Case Analysis", IEEE P802.3az Task Force, New Orleans, Jan. 2009, pp. 1-6.
Wang et al., U.S. Appl. No. 12/210,016, titled "Generating, at Least in Part, and/or Receiving, at Least in Part, at Least One Request", filed Sep. 12, 2008, 25 pages.
Wang et al., U.S. Appl. No. 12/210,016, titled as "Generating, at Least in Part, and/or Receiving, at Least in Part, at Least One Request", filed Sep. 12, 2008, 25 pages.
Wertheimer et al., U.S. Appl. No. 12/381,811, titled "Negotiating a Transmit Wake Time", filed Mar. 17, 2009, 31 pages.

(56) References Cited

OTHER PUBLICATIONS

Wertheimer et al., U.S. Appl. No. 13/489,434, titled "Negotiating a Transmit Wake Time", filed Jun. 5, 2012, 35 pages.
Woodruff et al., "10GBASE-T EEE Proposal xLPI", Aquantia, May 2008, pp. 1-11.
Zimmerman et al., "10GBase-T Active / Low-Power Idle Toggling", Energy Efficient Ethernet, Mar. 2008, pp. 1-15.
Zimmerman et al., "Update on Technical Feasibility of EEE with 10GBASE-T", Solarfare Communication, Jul. 16, 2007, pp. 1-9.
Zimmerman, George, "Considerations for Technical Feasibility of EEE with 10GBASE-T", Solarfare Communications, Mar. 7, 2007, pp. 1-10.
International Search Report and Written Opinion for PCT Patent Application No. PCT/US2009/056498, dated May 3, 2010, 10 pages.
International Search Report and Written Opinion received for PCT Patent Application No. PCT/US2008/082577, dated May 25, 2009, 10 pages.
Kasturia, Sanjay, "Next Steps for EEE Draft", Jan. 13, 2009, pp. 1-15.
Kasturia, Sanjay, "Next steps for EEE Draft", Jul. 16, 2008, pp. 1-18.
Kasturia, Sanjay, "Next Steps for EEE Draft", Mar. 10, 2009, pp. 1-13.
Kasturia, Sanjay, "Next steps for EEE Draft", Nov. 11, 2008, pp. 1-14.
Kasturia, Sanjay, Generating the EEE Draft, 10 pages.
Klein, Phillippe, "802.1 AVB Power Management", Broadcom, IEEE Interim Meeting, Jan. 2009, pp. 1-15.
Koenen et al., "Towards consistent organization of LPI Functions, State Variables and State Diagrams", IEEE Energy Efficient Ethernet TF, Nov. 2008, pp. 1-9.
Koenen, David, "Backplane Ethernet Low-Power Idle Baseline Proposal", IEEE 802.3az EEE Task Force, Jul. 2008, pp. 1-14.
Koenen, David, "Conditions for Backplane PHY EEE Transitions", HP, IEEE 802.3az, Nov. 2007, pp. 1-10.
Koenen, David, "EEE for Backplane PHYs in Blade Server Environment", IEEE 802.3 EEE SG, Mar. 2007, pp. 1-8.
Koenen, David, "In support of EEE mode for 1000BASE-KX PHY", HP, IEEE 802.3az EEE Task Force, May 2008, pp. 1-8.
Koenen, David, "Potential Ethernet Controller Power Savings", EEE, Geneva, May 2007, pp. 1-5.
Kubo et al., "Hybrid LPI and Subset PHY Approach", IEEE 802.3az, NTT Access Network Service Systems Labs., NTT Corporation, Jul. 2008, pp. 1-10.
Kulkarni, "Energy Efficient Communication based on user workloads", University of Texas at Dallas, May 19, 2008, 13 pages.
Kulkarni, A. "Energy Efficient Communication based on user workloads", University of Texas at Dallas, (May 19, 2008), 13 pgs.
Law et al., "Scope components for Rapid PHY selection", 2 pages.
Law, David, "IEEE 802.3 Clause 30 Management, MIB, Registars and Function", IEEE P802.3az, Energy-efficient Ethernet Task Force, Plenary Week Meeting, Nov. 2007, pp. 1-13.
Law, David, "IEEE P802.3az Asymmetric and Symmetric Modes", IEEE P802.3az EEE Task Force, Interim Meeting, Jan. 2009, Version 1.0, pp. 1-6.
Law, David, "IEEE P802.3az Energy-efficient Ethernet and LLDP", IEEE P802.3az EEE Task Force, Version 1.1, Interim Meeting, May 2008, pp. 1-7.
Law, David, "IEEE P802.3az Energy-Efficient Ethernet Architecture", IEEE P802.3az EEE Task Force, Version 2.0, Plenary week Meeting, Nov. 2008, pp. 1-20.
Law, David, "IEEE P802.3az Wait Time (Tw) From a System Design Perspective", IEEE P802.3az, IEEE Task Force, Version 3.0, Interim Meeting, Jan. 2009, pp. 1-18.
Law, David, "IEEE P802.3az Wake Time Shrinkage Ad Hoc report", IEEE P802.3az EEE Task Force, Version 5.0, Plenary week Meeting, Mar. 2009, pp. 1-13.

Law, David, "Transmit disable time in a packet based speed change protocol Impact on objectives", IEEE 802.3 EEE SG Interim Meeting, May 2007, pp. 1-8.
Law, David, "Two TX Wait Timers in RS for 10GBASE-T Operation", IEEE P802.3az EEE Task Force, Version 1.0, Interim Meeting, Jan. 2009, pp. 1-4.
Law, David, Packet loss in protocol based speed change, IEEE 802.3 EEE SG Interim Meeting, Sep. 2007, pp. 1-12.
Lin et al., "IEEE P802.3az/D1.1 Clause 40 PHY Control State Diagram Corner Case Analysis", IEEE 02.3az Task Force, New Orleans, Jan. 2009, pp. 1-9.
Louie et al., "Clause 73 Message p. 10", Broadcom, IEEE 802.3az Task Force, Jan. 2009, pp. 1-6.
Magic PacketTechnology, AMD, Publication No. 20213, Rev: A, Amendment/O, Nov. 1995, pp. 1-6.
McIntosh, James A., "Getting Stuck in UPDATE in the 1000BASE-T Phy Control State Machine", Vitesse Semiconductor Corp , IEEE 802.3az, Interim Meeting, Jan. 2009, pp. 1-8.
Minutes of meeting, 802.3az Energy Efficient Ethernet (EEE) Task Force and 802.1 Data Center Bridging (DCB) Task Group Joint meeting, Wednesday, Mar. 19, 2008, 5 pages.
Nedevschi et al., "Reducing Network Energy Consumption via Sleeping and Rate-Adaptation", 14 pages.
Nicholl, Gary, "100GE and 40GE PCS Overview", IEEE 802.3az, Nov. 2008, pp. 1-27.
Nordman, Bruce, "EEE Savings Estimates", IEEE 802 Plenary Meeting, San Francisco, Jul. 18, 2007, 9 pages.
Nordman, Bruce, "EEE Savings Estimates", May 25, 2007, pp. 1-11.
Nordman, Bruce, "Energy Efficient Ethernet: Outstanding Questions", IEEE 802 interim meeting, Monterey, California, Jan. 15-16, 2007, pp. 1-10.
Nordman, Bruce, "Energy Efficient Ethernet: Outstanding Questions", Mar. 12, 2007, 3 pages.
Nordman, Bruce, "Energy Efficient Ethernet: Outstanding Questions", Mar. 19, 2007, 3 pages.
Nordman, Bruce, "Energy Efficient Ethernet: Outstanding Questions—Update: Mar. 2007", IEEE 802 interim meeting, Orlando, Florida, Mar. 13-15, 2007, pp. 1-5.
Nordman, Bruce, "Musings on Savings", IEEE 802.3az Task Force Interim Meeting, Jan. 22, 2008, 8 pages.
Notice of Allowance Received for U.S. Appl. No. 11/296,958, dated Apr. 3, 2009, 4 pages.
Notice of Allowance Received for U.S. Appl. No. 11/936,327, dated Jul. 18, 2012, 25 pages.
Notice of Allowance Received for U.S. Appl. No. 12/208,905, dated Nov. 18, 2011, 16 pages.
Notice of Allowance Received for U.S. Appl. No. 12/210,016, dated Mar. 5, 2012, 13 pages.
Notice of Allowance Received for U.S. Appl. No. 12/381,811, dated Aug. 31, 2011, 9 pages.
Notice of Allowance Received for U.S. Appl. No. 13/489,434, dated Jun. 10, 2014, 9 pages.
Notice of Allowance Received for U.S. Appl. No. 13/489,434, dated Jun. 4, 2013, 8 pages.
Notice of Allowance Received for U.S. Appl. No. 13/647,262, dated May 12, 2014, 7 pages.
Notice of Allowance Received for U.S. Appl. No. 13/647,262, dated Oct. 18, 2013, 9 pages.
Office Action Received for Chinese Patent Application No. 200880115221.6, dated Apr. 6, 2012, 6 pages of Chinese Office Action and 9 pages of English Translation.
Office Action Received for Chinese Patent Application No. 200880115221.6, dated Jan. 7, 2013, 6 Pages of Chinese Office Action and 8 Pages of English Translation.
Office Action Received for Chinese Patent Application No. 200980135378.X, dated Aug. 26, 2013, 3 pages of Chinese Office Action and 4 pages of English Translation.
Office Action Received for Chinese Patent Application No. 200980135378.X, dated Aug. 26, 2013, 3 pages of Office Action and 4 pages of English Translation.

(56) References Cited

OTHER PUBLICATIONS

Office Action Received for Chinese Patent Application No. 200980135378.X, dated Mar. 6, 2013, 11 pages of Chinese Office Action and 14 pages of English Translation.
Office Action Received for Chinese Patent Application No. 200980135378.X, dated Mar. 6, 2013, 11 pages of office action and 14 pages of english translation.
Office Action Received for European Patent Application No. 08848070.2, dated Oct. 15, 2013, 5 Pages of Office Action.
Office Action Received for European Patent Application No. 08848070.2, dated Oct. 2, 2013, 9 pages.
Office Action Received for Japanese Patent Application No. 2011-526969, dated Jun. 5, 2012, 2 pages of Japanese Office Action, and 2 pages of English Translation.
Office Action Received for Japanese Patent Application No. 2011-526969, dated Jun. 5, 2012, 2 pages of office action and 2 pages of english translation.
Office Action Received for Japanese Patent Application No. 2011-526969, dated Oct. 2, 2012, 2 pages of Japanese Office Action and 2 pages of English Translation.
Office Action Received for Japanese Patent Application No. 2011-526969, dated Oct. 2, 2012, 2 pages of office action and 2 pages of english translation.
Office Action Received for Japanese Patent Application No. 2012-286613, dated Jan. 14, 2014, 1 page of Office Action and 1 Page of English Translation.
Office Action Received for Japanese Patent Application No. 2012-286613, dated May 7, 2014, 2 Pages of Office Action and 1 Page of English Translation.
Office Action Received for Korean Patent Application No. 10-2011-7005968, dated Jun. 19, 2012, 3 pages of office action and 2 pages of english translation.
Office Action Received for U.S. Appl. No. 11/296,958, dated Dec. 2, 2008, 21 pages.
Office Action Received for U.S. Appl. No. 11/936,327, dated Jan. 11, 2011, 8 pages.
Office Action Received for U.S. Appl. No. 11/936,327, dated Jan. 24, 2012, 8 pages.
Office Action Received for U.S. Appl. No. 111936,327, dated Aug. 26, 2011, 8 pages.
Office Action Received for U.S. Appl. No. 12/208,905, dated Apr. 12, 2011, 14 pages.
Office Action Received for U.S. Appl. No. 12/208,905, dated Aug. 1, 2011, 16 pages.
Office Action Received for U.S. Appl. No. 12/210,016, dated Jun. 9, 2011, 16 pages.
Office Action Received for U.S. Appl. No. 12/210,016, dated Jun. 9, 2011, 20 pages.
Office Action Received for U.S. Appl. No. 12/484,028, dated Apr. 5, 2013, 20 pages.
Office Action Received for U.S. Appl. No. 12/484,028, dated Jun. 18, 2014 18 pages.
Office Action Received for U.S. Appl. No. 12/484,028, dated Nov. 5, 2012, 15 pages.
Office Action Received for U.S. Appl. No. 12/484,028, dated Sep. 19, 2013, 20 pages.
Office Action Received for U.S. Appl. No. 13/489,434, dated Dec. 26, 2012, 9 pages.
Office Action Received for U.S. Appl. No. 13/647,262, dated Feb. 27, 2013, 7 pages.
Office Action Received for U.S. Appl. No. 13/647,262, dated Jun. 11, 2013, 6 pages.
Office Action Received for U.S. Appl. No. 13/889,472, dated Jul. 17, 2014, 7 pages.
Parnaby et al., "10GBase-T Active / Low-Power Idle Toggling", Energy Efficient Ethernet, Jan. 2008, pp. 1-14.
Parnaby, Gavin, "10GBASE-T ad hoc output", Solarflare Communication, Sep. 16, 2008, pp. 1-10.
Parnaby, Gavin, "10GBASE-T EEE Synchronization", Solarflare Communication, Nov. 11, 2008, pp. 1-16.
Parnaby, Gavin, "10GBASE-T Parameter Values", 1 page.
Parnaby, Gavin, "EEE Synchronization", Solarfare Communication, Jan. 14, 2009, pp. 1-5.
Parnaby, Gavin, "Filling the 10GBASE-T TBDs: Wake & Sleep", Solarflare Communication, Sep. 15, 2008, pp. 1-6.
Paxson, Vern, "Some Perspectives on the Performance Impact of Link-Speed Switching Outages", Jul. 18, 2007, 10 pages.
Pillai et al., "Clause 49 State DiagramsClause Diagrams", Broadcom, IEEE 802.3az, Jan. 2009, 7 pages.
Pillai et al., "KR, KX4 and KX LPI Parameters", Broadcom, IEEE 802.3az, Jan. 2009, pp. 1-16.
Pillai, "Values Needed for 10GBASE-KR", Mar. 11, 2009, pp. 1-3.
Pillai, Velu, "Enhanced EEE proposal for 10GBASE-KR", Broadcom, IEEE 802.3az, Mar. 2009, 8 pages.
Powell et al., "A "Subset PHY" Approach for Energy Efficient Ethernet", Broadcom, IEEE 802.3az EEE, Jan. 2008, pp. 1-17.
Powell et al., "A Gigabit "Subset PHY"Approach for 10GBASE for 10GBASE-T Energy Efficient Ethernet", Broadcom, IEEE 802.3az EEE, Nov. 2007, pp. 1-11.
Powell et al., "Technical Considerations and Possible Solution Sets for EEE", IEEE 802.3 Energy Efficient Ethernet Study Group Interim Meeting, Broadcom, May 2007, pp. 1-7.
Powell, Scott, "Twisted Pair Subset PHY", Broadcom, IEEE 802.3az EEE, Mar. 2008, pp. 1-21.
Ratnasamy et al., "Reducing Network Energy Consumption via Sleeping and Rate-Adaptation", pp. 1-29.
Sedarat, Hossein, "10GBASE-T EEE Specifications Alert", Aquantia, Sep. 2008, pp. 1-7.
Mohapatra S et al., "DYNAMO: A Cross-Layer Framework for End-to-End QoS and Energy Optimization in Mobile Handheld Devices", IEEE Journal on Selected Areas in Communications, IEEE Service Center, Piscataway, US, vol. 25, No. 4, May 1, 2007, pp. 722-737.
Shiao-Li Tsao et al., Reducing voice over WLAN call setup delay under limited access point buffer:, Consumer Communications and Networking Conference, 2006. CCNC 2006. 20 06 3rd IEEE Las Vegas, NV, USA Jan. 8-10, 2206, Piscataway, NJ, USA, IEEE, vol. 1, Jan. 8, 2006 (Jan. 8, 2006), pp. 380-384.
Walewski, "EEE for Real-Time Industrial Ethernet (?)", IEEE 802 plenary meeting, Vancouver, BC, Mar. 10, 2009, pp. 1-15.
Wang et al., "IEEE P802.3az/D1.1 Clause 24 Receive State Diagram Comer Case Analysis", IEEE P802.3az Task Force, New Orleans, Jan. 2009, pp. 1-6.
Wertheimer et al., "Capabilities Negotiation Proposal for Energy-Efficient Ethernet", IEEE 802.3az, Munich, May 2008, pp. 1-18.
Wertheimer, Aviad, "Negotiation Proposal for LPI EEE", IEEE 802.3az Task Force, Mar. 2008, pp. 1-10.
Woodruff et al., "10GBASE-T EEE Proposal xLPI", Aquantia, pp. 1-11.
Woodruff et al., "Efficiency and EEE-Technical Feasibility", May 29, 2007, pp. 1-15.
Woodruff, "10GEEE—Time to Switch", Mar. 2007, pp. 1-8.
Zimmerman et al., "10GBase-T Active / Low Low-Power Idle Toggling with Sense Interval", Energy Efficient Ethernet, Mar. 2008, pp. 1-2.
Zimmerman et al., "Deep Sleep Idle Concept for PHYs", Energy Efficient Ethernet, Solarflare Communication, Nov. 6, 2007, pp. 1-14.
Zimmerman et al., "Update on Technical Feasibility of EEE with 10GBASE 10GBASE-T", Solarfare Communication, Jul. 16, 2007, pp. 1-9.
Zimmerman, "10GBase 10GBase-T Active / Low Low-Power Idle Toggling", Energy Efficient Ethernet, Mar. 2008, pp. 1-15.
Zimmerman, George, "Considerations for Technical Feasibility of EEE with 10GBASE 10GBASE-T", Mar. 7, 2007, pp. 1-10.

\* cited by examiner

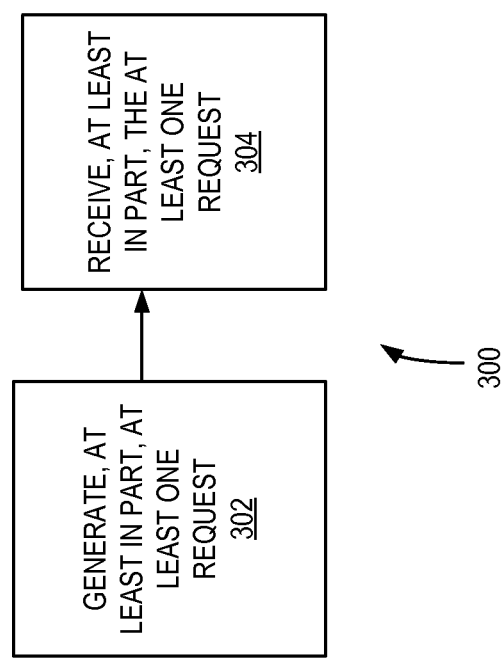

GENERATING, AT LEAST IN PART, AND/OR RECEIVING, AT LEAST IN PART, AT LEAST ONE REQUEST

CROSS-REFERENCE TO RELATED APPLICATIONS

This application is a continuation of U.S. patent application Ser. No. 16/410,442 filed on May 13, 2019, which is a divisional of U.S. patent application Ser. No. 13/540,246, filed on Jul. 2, 2012, which is a continuation of U.S. patent application Ser. No. 12/210,016 filed on Sep. 12, 2008, now U.S. Pat. No. 8,213,303. These applications are herein incorporated by reference in its entirety.

FIELD

This disclosure relates to generating, at least in part, and/or receiving, at least in part, at least one request.

BACKGROUND

In one conventional network arrangement, computers are coupled together via communication media. In order to reduce power consumption, during periods of inactivity or reduced activity, the computers may be powered off, or enter low power modes of operation (e.g., "sleep" modes) in which various resources (e.g., network interfaces, monitors, etc.) may be powered off. Typically, decisions whether to power off or enter such low power modes of operation are separately made by each individual computer in the network, and do not involve or contemplate coordination or collaboration among the individual computers. Disadvantageously, this reduces the effectiveness of power management in the network, and increases the likelihood that data transmitted between or among computers in the network will be lost (e.g., as a result of the intended recipient being powered off or in a mode of operation in which the recipient cannot receive the data).

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which:

FIG. 3 illustrates operations that may be performed according to an embodiment.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
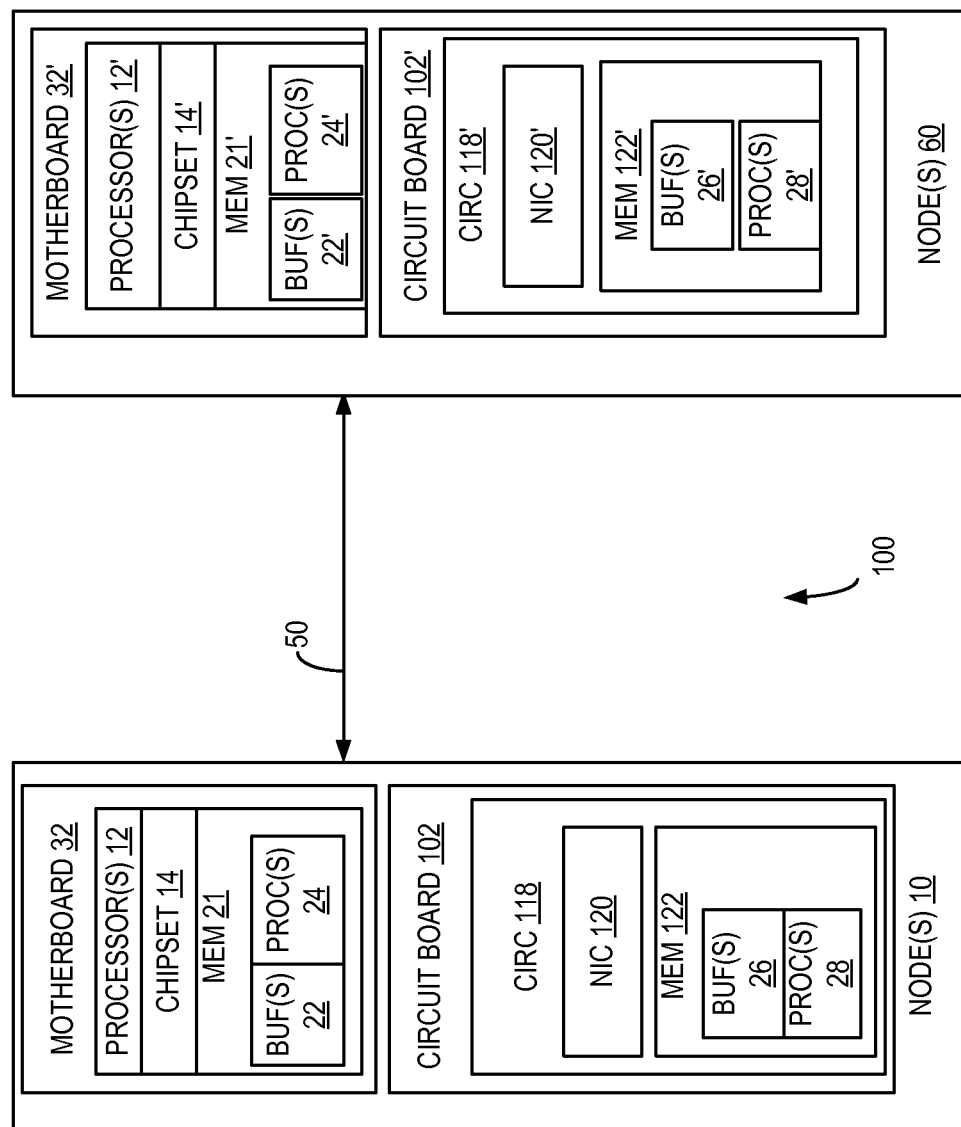
FIG. 1 illustrates a system embodiment.

FIG. 1 illustrates a system embodiment 100. System 100 may include one or more network nodes 10 that may be communicatively coupled via one or more communication links 50 to one or more other network nodes 60. In this embodiment, a "network node" or "node" may be used interchangeably to mean an entity communicatively coupled in and/or to a network, such as, for example, an end station, intermediate station, network interface, and/or portion thereof. In this embodiment, a "network" may be or comprise two or more nodes that are communicatively coupled together. Also in this embodiment, a node may be "communicatively coupled" to another node if the one node is capable of transmitting to and/or receiving from the other node one or more packets. As used herein, a "packet" may comprise one or more symbols and/or values.

In this embodiment, one or more nodes 10 and/or one or more nodes 60 may comprise one or more respective host computer systems. For example, in this embodiment, as shown in FIG. 1, one or more nodes 10 may comprise circuit board 102 and motherboard 32. Motherboard 32 may comprise one or more host processors 12. Each of the host processors 12 may be coupled (e.g., via a respective not shown segment of a proprietary bus) to a chipset 14. Each of the one or more host processors 12 may comprise, for example, a respective Intel® Core™ 2 VPro™ microprocessor that is commercially available from the Assignee of the subject application. As used herein, a "processor" means circuitry capable of performing, at least in part, one or more arithmetic and/or logical operations. Of course, alternatively, each of the host processors 12 may comprise, for example, a respective microprocessor that is manufactured and/or commercially available from a source other than the Assignee of the subject application, without departing from this embodiment.

Chipset 14 may comprise a not shown memory controller hub that may couple one or more host processors 12, a system memory 21 and a not shown user interface system to each other and to a not shown bus system. Chipset 14 may comprise one or more integrated circuit chips selected from, for example, one or more integrated circuit chipsets available from the Assignee of the subject application (e.g., memory controller hub and I/O controller hub chipsets), although one or more other integrated circuit chips may also, or alternatively be used, without departing from this embodiment. The not shown user interface system may comprise, e.g., a keyboard, pointing device, and display system that may permit a human user to input commands to, and monitor the operation of, system 100. The not shown bus system may comprise one or more buses that may comply with the bus protocol described in Peripheral Component Interconnect (PCI) Express™ Base Specification Revision 1.0, published Jul. 22, 2002, available from the PCI Special Interest Group, Portland, Oreg., U.S.A. Alternatively, the bus may comprise other types of bus systems, without departing from this embodiment.

Circuit card 102 in one or more nodes 10 may be communicatively coupled to circuit card 102' in one or more nodes 60 via links 50. Circuit card 102 may comprise operative circuitry 118. Operative circuitry 118 may comprise network interface controller (NIC) 120 and memory 122.

Processors 12, system memory 21, and chipset 14 may be comprised in a single circuit board, such as, for example, system motherboard 32. Motherboard 32 also may comprise the not shown bus system and a not shown bus card slot. Card 102 may include a not shown bus connector that may be capable of being electrically and mechanically coupled to the bus card slot that may be comprised in the motherboard 32. When the bus connector of card 102 is so coupled to the bus card slot comprised in motherboard 32, operative circuitry 118 may become communicatively coupled to motherboard 32.

Alternatively, without departing from this embodiment, some or all of the operative circuitry 118 of card 102 may not be comprised in card 102, but instead, may be comprised in other structures, systems, and/or devices. These other structures, systems, and/or devices may be, for example, comprised in motherboard 32 (e.g., as part of host processor 12 and/or chipset 14).

One or more machine-readable program instructions may be stored in computer-readable/writable memory 122 and/or 21. In operation of one or more nodes 10, these instructions may be accessed and executed by NIC 120 and/or one or more host processors 12. When executed by NIC 120 and/or one or more host processors 12, these one or more instructions may result in NIC 120, operative circuitry 118, host processor 12, and/or card 102 performing the operations described herein as being performed by NIC 120, operative circuitry 118, host processor 12, and/or card 102. Also when executed by NIC 120 and/or one or more host processors 12, these one or more instructions may result in one or more program processes 24 and/or 28 being executed, at least in part, by NIC 120, operative circuitry 118, and/or one or more host processors 12. Computer-readable/writable memory 21 and 122 may each comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory. Memory 21 and/or 122 may comprise one or more buffers 22 and/or 26.

One or more nodes 60 may comprise motherboard 32' and circuit board 102' whose construction may conform, in whole or in part, to the construction of motherboard 32 and circuit board 102, respectively. Thus, motherboard 32' may comprise one or more host processors 12', chipset 14', and memory 21' whose construction may conform, in whole or in part, to the construction of one or more host processors 12', chipset 14', and memory 21'. Additionally, circuit board 102' may comprise operative circuitry 118' whose construction may conform, in whole or in part, to the construction of circuitry 118. Circuitry 118' may comprise NIC 120' and memory 122' whose construction may conform, in whole or in part, to the construction of NIC 120 and memory 122. Circuit board 102' and circuitry 118' may be communicatively coupled via one or more links 50 to circuit board 102 and circuitry 118.

One or more machine-readable program instructions may be stored in computer-readable memory (not shown) in circuitry 118'. In operation of one or more nodes 60, these instructions may be accessed and executed by computer-readable/writable memory 122' and/or 21'. In operation of one or more nodes 60, these instructions may be accessed and executed by NIC 120' and/or one or more host processors 12'. When executed by NIC 120' and/or one or more host processors 12', these one or more instructions may result in NIC 120', operative circuitry 118', one or more host processors 12', and/or card 102' performing the operations described herein as being performed by NIC 120', operative circuitry 118', one or more host processors 12', and/or card 102'. Also when executed by NIC 120' and/or one or more host processors 12', these one or more instructions may result in one or more program processes 24' and/or 28' being executed, at least in part, by NIC 120', operative circuitry 118', and/or one or more host processors 12'. Computer-readable/writable memory 21' and 122' may each comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory. Memory 21' and/or 122' may comprise one or more buffers 22' and/or 26'.

One or more communication links 50 may be compatible with one or more communication protocols, and circuitry 118 in one or more nodes 10 may exchange data and/or commands with circuitry 118' in one or more nodes 60 via links 50, in accordance with these one or more communication protocols. For example, in this embodiment, one or more links 50 may be compatible with, and the respective operative circuitry 118 may exchange data and/or commands with circuitry 118' in accordance with, e.g., an Ethernet protocol and/or Transmission Control Protocol/Internet Protocol (TCP/IP) protocol.

The Ethernet protocol utilized in system 100 may comply or be compatible with the protocol described in Institute of Electrical and Electronics Engineers, Inc. (IEEE) Std. 802.3, 2000 Edition, published on Oct. 20, 2000. Alternatively or additionally, the TCP/IP protocol utilized in system 100 may comply or be compatible with the protocols described in Internet Engineering Task Force (IETF) Request For Comments (RFC) 791 and 793, published September 1981. Of course, many different communication protocols may be used for such data and/or command exchange without departing from this embodiment.

Figure 2:
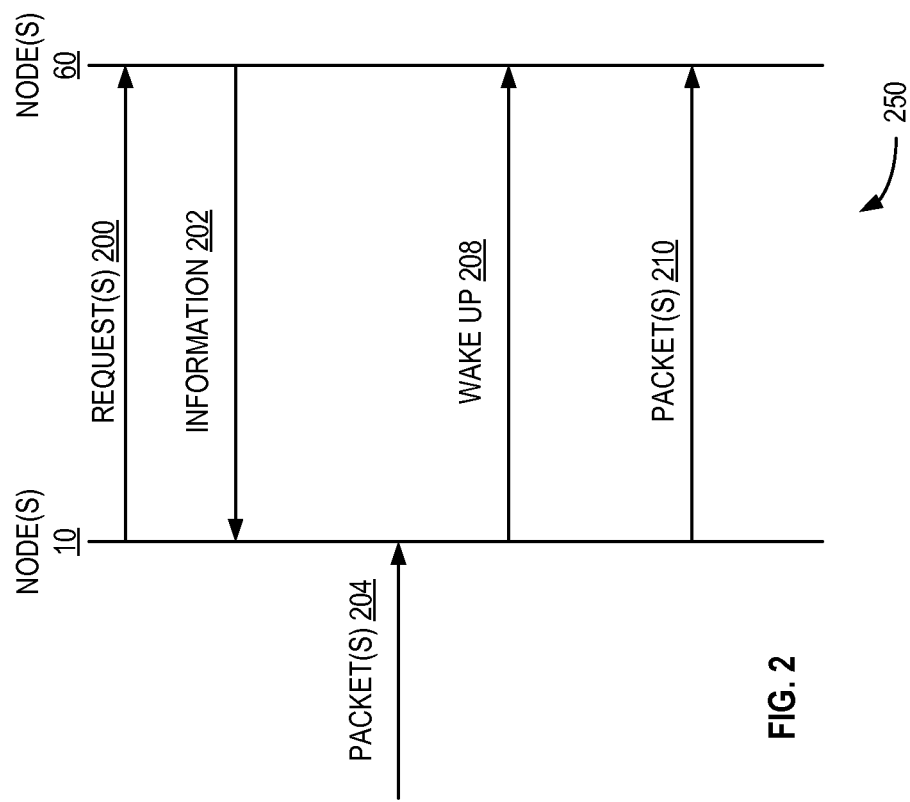
FIG. 2 illustrates transmissions that may take place in the system embodiment of FIG. 1.

With reference now being made to FIGS. 1 to 3, transmissions 250 (see FIG. 2) that may occur, and operations 300 (see FIG. 3) that may be performed in system 100 according to an embodiment will be described. After, for example, a reset of system 100, one or more processes 24 and/or 28 may signal one or more processors 12, circuitry 118, and/or NIC 120. In this embodiment, this may result in one or more processors 12, circuitry 118, and/or NIC 120 initiating, at least in part, negotiation and/or exchange, at least in part, between at least one node 10 and at least one node 60 (via one or more links 50) of one or more parameters defining, related to, enabling, and/or facilitating, at least in part, entry of at least one node 60 into at least one relatively lower power consumption state relative to a present relatively higher power consumption state of at least one node 60. For example, this negotiation may comprise generation, at least in part, by one or more processors 12, circuitry 118, and/or NIC 120 of at least one request 200 (as illustrated by operation 302 in FIG. 3, and transmission, at least in part, via one or more links 50 of the at least one request 200 to at least one node 60. The at least one request 200 may request, at least in part, that at least one node 60 generate, at least in part, information 202 to be used by the at least one node 10 and/or at least one node 60. The information 202 may permit the selection, at least in part, of (1) the at least one relatively lower power consumption state of at least one node 60 and (2) at least one time period to elapse, after receipt by the at least one node 10 of at least one packet 204 (intended to be transmitted to the at least one node 60), prior to requesting that the at least one node 60 change at least one power consumption state of the at least one node 60.

After the at least one request 200 has been transmitted, at least in part, via the one or more links 50, to at least one node 60, one or more processors 12', circuitry 118', and/or NIC 120' may receive, at least in part, the at least one request 200, as illustrated by operation 304 in FIG. 3. This may result, at least in part, in one or more processes 24' and/or 28' signaling one or more processors 12', circuitry 118', and/or NIC 120'. This may result, at least in part, in one or more processors 12', circuitry 118', and/or NIC 120' generating, at least in part, information 202.

For example, in this embodiment, as part of this generation, at least in part, of information 202, one or more processors 12', circuitry 118', and/or NIC 120' may determine, at least in part, packet buffering capability of at least one node 10 and/or packet buffering capability of at least one node 60 that may be employed while at least one node 60 is in the relatively lower power consumption state, and/or requested quality of service (QOS) for communication between at least one node 10 and at least one node 60.

This buffering capability of at least one node 10 may be communicated, at least in part, to at least one node 60 via one or more fields (not shown) that may be comprised in at least one request 200 and/or via one or more other communications (not shown) that may be made from at least one node 10 to at least one node 60. This buffering capability of at least one node 10 may be communicated, at least in part, to at least one node 60 in terms of, for example, a maximum time Tu that at least one node 10 is able to buffer one or more packets 204 that at least one node 10 may receive, while at least one node 60 is in the relatively lower power consumption state, that are intended for transmission to at least one node 60. One or more processors 12, circuitry 118, and/or NIC 120 may determine, at least in part, this maximum time Tu, based at least in part, upon the following relationship: Tu=Bu/Su, where Bu is the size (e.g., storage capability) of one or more buffers 22 and/or 26 dedicated to buffer one or packets 204 received by at least one node 10 that are intended to be transmitted to at least one node 60, and Su is the actual or expected incoming packet transmission rate to the one or more buffers 22 and/or 26 dedicated to buffer one or more packets 204. In the event, that multiple incoming channels or links feed into one or more buffers 22 and/or 26, Su may be set equal to the sum of the actual or expected incoming packet transmission rates of these incoming channels or links.

One or more processors 12', circuitry 118', and/or NIC 120' in at least one node 60 may determine, at least in part, its own respective packet buffering capability, if any, while at least node 60 is in the relatively lower power consumption state. This buffering capability of at least one node 60 may be determined, at least in part, in terms of, for example, a maximum time Td that at least one node 60 is able to buffer one or more packets that at least one node 60 may receive while at least one node 60 is in the relatively lower power consumption state.

If the at least one node 60 is unable to buffer one or more packets received by at least one node 60 while at least one node 60 is in the relatively lower power consumption state (e.g., one or more buffers 22' and/or 26' are not or cannot be dedicated to such task and/or at least one node 60 is otherwise incapable of carrying out such buffering while in the relatively lower power consumption state), one or more processors 12', circuitry 118', and/or NIC 120' may set Td equal to zero. In this case, one or more processors 12', circuitry 118', and/or NIC 120' may determine, at least in part, that the maximum latency time period L max that can be permitted to elapse, without resulting in at least partial loss of one or more packets 204 being buffered in at least one node 10, after the at least one node 60 has entered the relatively lower power state, before at least one node 60 should return to a relatively higher power consumption state in which at least one node 60 is capable of receiving one or more incoming packets, is Tu (i.e., Lmax=Tu). Accordingly, one or more processors 12', circuitry 118', and/or NIC 120' may select, at least in part, a relatively lower power consumption state that exhibits the maximum possible power savings consistent with a resume latency period (i.e., the time period between entry into the relatively lower power consumption state and return to the relatively higher power consumption state) Ld that is less than or equal to L max (i.e., Ld<=L max). In this relatively lower power consumption state, one or more components of at least one node 60 may be powered off or otherwise in one or more modes of operation that may consume relatively lower amounts of power.

In order to ensure adequate communication performance between at least one node 10 and at least one node 60, requested QOS for communication between at least one node 10 and at least one node 60 may be defined (e.g., as selected, at least in part, by a not shown human operator and/or protocol and/or application program-related considerations), at least in part, in terms of the maximum delay D max that may be permitted for packet transmission from at least one node 10 to at least one node 60 via one or more links 50. Information 202 may comprise and/or indicate, at least in part, D max and Ld, and these parameters (e.g., D max and Ld) may be communicated, at least in part, to one or more processors 12, circuitry 118, and/or NIC 120 by one or more processors 12', circuitry 118', and/or NIC 120' via one or more links 50.

In response, at least in part, to receipt, at least in part, of this information 202, one or more processors 12, circuitry 118, and/or NIC 120 may select, at least in part, at least one time period Tw to elapse (after at least one node has entered the relatively lower power consumption state) after the at least one node 10 receives, at least in part, at least one packet 204, prior to requesting at least one change of the at least one power consumption state of the at least one node 60 (e.g., from the relatively lower power consumption state to a relatively higher power consumption state (e.g., its present relatively higher power consumption state) in which the at least one node 60 may be capable of receiving and processing the at least one packet 204). This time period Tw may be equal to the first of the following conditions (1) or (2) to occur: (1) a time period set to Dmax−max (Ld, L1) expires, or (2) the remaining amount of one or more buffers 22 and/or 26 (i.e., amount of one or more buffers 22 and/or 26 that is available and not filled with one or more packets 204) becomes less or equal to Su*max (Ld, L1), where L1 is the communication link resume latency of one or more links 50. Depending upon the particular nature of and/or protocol or protocols utilized by one or more links 50, link resume latency L1 may either be communicated to at least one node 10 by at least one node 60 (or vice versa), or link resume latency L1 may be predetermined or otherwise already known by one or more of the link partners (i.e., by at least one node 10 and/or at least one node 60) and communicated among them as necessary. In this embodiment, condition (1) is set in order to permit the requested QOS to be met, while condition (2) is set to prevent loss of packet data that is being buffered in one or more buffers 22 and/or 26. Alternatively or additionally, in the case where the greater of Ld or L1 is equal to L max (i.e., max (Ld, L1)=L max), Tw may expire may expire immediately after receipt of one or more packets 204 by at least one node 10.

After one or more processors 12, circuitry 118, and/or NIC 120 has calculated, at least in part, the value of Tw set by condition (1), one or more processors 12, circuitry 118, and/or NIC 120 may signal (via one or more links 50) at least one node 60 to enter the relatively lower power consumption state selected, at least in part, by one or more processors 12', circuitry 118', and/or NIC 120'. This may result, at least in part, in one or more processors 12', circuitry 118', and/or NIC 120' initiating and/or executing, at least in part, transition and/or entry, at least in part, of at least one node 60 into the relatively lower power consumption state from the present relatively higher power consumption state of at least one node 60. Thereafter, at least one node 60 may enter and remain in the relatively lower power consumption state, and one or more packets 204 received by at least one node 10 may be buffered in one or more buffers 22 and/or 26 in at least one node 10.

After Tw has elapsed, one or more processors 12, circuitry 118, and/or NIC 120 issue and transmit, at least in part, at least one wake up request 208 to one or more processors 12', circuitry 118', and/or NIC 120' via one or more links 50. This may result, at least in part, in one or more processors 12', circuitry 118', and/or NIC 120' initiating and/or executing, at least in part, transition and/or entry, at least in part, of at least one node 60 into a relatively higher power consumption state in which the at least one node 60 may receive and process one or more packets 204 that may be thereafter transmitted from at least node 10 to at least one node 60. Thereafter, at least one node 60 may enter and remain in the relatively higher power consumption state. After sending, at least in part, at least one wake up request 208 to at least one node 60, one or more processors 12, circuitry 118, and/or NIC 120 may wait until the larger of Ld or L1 has elapsed, and thereafter, may transmit one or more packets 210 (corresponding to one or more packet 204) buffered in one or more buffers 22 and/or 26 to at least one node 10.

Conversely, if at least one node 60 is able to buffer one or packets received by at least one node 60 while at least one node 60 is in the relatively lower power consumption state, one or more processors 12', circuitry 118', and/or NIC 120' in at least one node 60 may determine, at least in part, time Td such that Td may be equal to the lesser of either Bd divided by Su, or the difference of Tu minus L1, multiplied by Sd, then divided by Su (i.e., Td=min {Bd, (Tu−L1)*Sd}/Su), where Bd is the size (e.g., storage capability) of one or more buffers 22' and/or 26' dedicated to buffer one or packets received by at least one node 60 while at least one node 60 is in the relatively lower power consumption state, L1 is the communication link resume latency of one or more links 50, and Sd is the actual or expected incoming packet transmission rate to the one or more buffers 22' and/or 26' while at least one node 60 is in the relatively lower power consumption state. In this case, one or more processors 12', circuitry 118', and/or NIC 120' may determine, at least in part, that the maximum latency time period L max is Tu summed with Td (i.e., Lmax=Tu+Td). Accordingly, one or more processors 12', circuitry 118', and/or NIC 120' may select, at least in part, a relatively lower power consumption state that exhibits the maximum possible power savings consistent with a resume latency period (i.e., the time period between entry into the relatively lower power consumption state and return to the relatively higher power consumption state) Ld that is less than or equal to L max (i.e., Ld<=L max). In this relatively lower power consumption state, one or more components of at least one node 60 may be powered off or otherwise in one or more modes of operation that may consume relatively lower amounts of power. In this case, information 202 may comprise and/or indicate, at least in part, D max and Ld, and these parameters (e.g., D max and Ld) may be communicated, at least in part, to one or more processors 12, circuitry 118, and/or NIC 120 by one or more processors 12', circuitry 118', and/or NIC 120' via one or more links 50.

In response, at least in part, to receipt, at least in part, of this information 202, one or more processors 12, circuitry 118, and/or NIC 120 may select, at least in part, at least one time period Tw. If L1 is greater than or equal to Ld (i.e., L1>=Ld), Tw may be set in accordance, at least in part, with the conditions (1) or (2) discussed above in connection with the situation in which at least one node 60 is incapable of buffering one or more packets while at least one node is in the relatively lower power consumption state. After one or more processors 12, circuitry 118, and/or NIC 120 has calculated, at least in part, the value of Tw set by condition (1), one or more processors 12, circuitry 118, and/or NIC 120 may signal (via one or more links 50) at least one node 60 to enter the relatively lower power consumption state selected, at least in part, by one or more processors 12', circuitry 118', and/or NIC 120'. This may result, at least in part, in one or more processors 12', circuitry 118', and/or NIC 120' initiating and/or executing, at least in part, transition and/or entry, at least in part, of at least one node 60 into the relatively lower power consumption state from the present relatively higher power consumption state of at least one node 60. Thereafter, at least one node 60 may enter and remain in the relatively lower power consumption state, and one or more packets 204 received by at least one node 10 may be buffered in one or more buffers 22 and/or 26 in at least one node 10.

After Tw has elapsed, one or more processors 12, circuitry 118, and/or NIC 120 issue and transmit, at least in part, at least one wake up request 208 to one or more processors 12', circuitry 118', and/or NIC 120' via one or more links 50. This may result, at least in part, in one or more processors 12', circuitry 118', and/or NIC 120' initiating and/or executing, at least in part, transition and/or entry, at least in part, of at least one node 60 into a relatively higher power consumption state in which the at least one node 60 may receive and process one or more packets 204 that may be thereafter transmitted from at least node 10 to at least one node 60. Thereafter, at least one node 60 may enter and remain in the relatively higher power consumption state. After sending, at least in part, at least one wake up request 208 to at least one node 60, one or more processors 12, circuitry 118, and/or NIC 120 may wait until the larger of Ld or L1 has elapsed (while still continuing to buffer the one or more packets 204 received by at least one node 10), and thereafter, may transmit one or more packets 204 buffered in one or more buffers 22 and/or 26 to at least one node 10.

Conversely, if at least one node 60 is able to buffer one or packets received by at least one node 60 while at least one node 60 is in the relatively lower power consumption state, and L1 is less than Ld, Tw may be set equal to the first of the following conditions (3) or (4) to occur: (3) a time period equal to Dmax−max (Ld, L1) expires, or (4) the remaining amount of one or more buffers 22, 26 (i.e., amount of one or more buffers 22 and/or 26 that is available and not filled with one or more packets 204) becomes less or equal to Su*(Ld−Td). In this embodiment, condition (3) is set in order to permit the requested QOS to be met, while condition (4) is set to prevent loss of packet data that is being buffered in one or more buffers 22 and/or 26. After one or more processors 12, circuitry 118, and/or NIC 120 has calculated, at least in part, the value of Tw set by condition (1), one or more processors 12, circuitry 118, and/or NIC 120 may signal (via one or more links 50) at least one node 60 to enter the relatively lower power consumption state selected, at least in part, by one or more processors 12', circuitry 118', and/or NIC 120'. This may result, at least in part, in one or more processors 12', circuitry 118', and/or NIC 120' initiating and/or executing, at least in part, transition and/or entry, at least in part, of at least one node 60 into the relatively lower power consumption state from the present relatively higher power consumption state of at least one node 60. Thereafter, at least one node 60 may enter and remain in the relatively lower power consumption state, and one or more packets 204 received by at least one node 10 may be buffered in one or more buffers 22 and/or 26 in at least one node 10. After Tw has elapsed, one or more processors 12, circuitry 118, and/or NIC 120 issue and transmit, at least in part, at least one wake up request 208 to one or more processors 12', circuitry 118', and/or NIC 120' via one or more links 50. This may result, at least in part, in one or more processors 12', circuitry 118', and/or NIC 120' initiating and/or executing, at least in part, transition and/or entry, at least in part, of at least one node 60 into a relatively higher power consumption state in which the at least one node 60 may receive and process one or more packets 204 that may be thereafter transmitted from at least node 10 to at least one node 60. Thereafter, at least one node 60 may enter and remain in the relatively higher power consumption state. After sending, at least in part, at least one wake up request 208 to at least one node 60, if L1>=Ld, one or more processors 12, circuitry 118, and/or NIC 120 may wait until L1 has elapsed, and thereafter, may transmit (as one or more packets 210) all of one or more packets 204 buffered in one or more buffers 22 and/or 26 to at least one node 10. Conversely, after sending, at least in part, at least one wake up request 208, if L1<Ld, one or more processors 12, circuitry 118, and/or NIC 120 may transmit (as one or more packets 210), after L1 has elapsed but before Ld has elapsed), an amount of one or more packets 204 that may be equal to Td*Su, while continuing the buffering of remaining and/or later received portions of one or more packets 204, and any such portions of the one or more packets 204 may be transmitted to at least one node 60 after Ld has elapsed. Advantageously, this may avoid loss of packet data buffered in at least one node 10.

Thus, in an embodiment, an apparatus is provided that may include circuitry to generate, at least in part, and/or receive, at least in part, at least one request that at least one network node generate, at least in part, information. The information may be to permit selection, at least in part, of (1) at least one power consumption state of the at least one network node, and (2) at least one time period. The at least one time period may be to elapse, after receipt by at least one other network node of at least one packet, prior to requesting at least one change in the at least one power consumption state. The at least one packet may be to be transmitted to the at least one network node.

Advantageously, in this embodiment, decisions whether and/or parameters involving change in power consumption states may be carried out, at least in part, in a collaborative and/or coordinated fashion between pairs of nodes in the network. Advantageously, this may synergistically increase the effectiveness of power management in the network of this embodiment, and decrease the likelihood that data transmitted between or among nodes in the network will be lost, compared to the prior art. Further advantageously, in this embodiment, if both nodes in a respective pair of nodes involved in the decision making are capable of buffering, while one of the nodes is in the relatively lower power consumption state, one or more packets intended for transmission to that one node, the embodiment may synergistically utilize the respective buffering capabilities of the pair as a single virtual buffer, thereby enhancing the power management effectiveness of this embodiment compared to the prior art.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Indeed, without departing from this embodiment, system 100 may include more or fewer than the elements shown in the Figures and described previously herein as being comprised system 100. Accordingly, the claims are intended to cover all such equivalents.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The invention claimed is:

1. At least one non-transitory computer-readable medium storing one or more instructions that when executed by a machine, result in execution of operations to:
   determine a system parameter of a first time duration, wherein
      the system parameter of the first time duration is indicative of an amount of time that a transmitter is to not transmit a data packet to a receiver link partner;
   cease transmission of one or more data packets by the transmitter to the receiver link partner based, at least in part, on the first time duration;
   cause transmission of a wake signal by the transmitter to the receiver link partner; and
   after a second time duration and after the transmission of the wake signal, permit the transmitter to transmit one or more data packets to the receiver link partner.

2. The computer-readable medium of claim 1, wherein the transmitter comprises a network interface controller (NIC) and the NIC is to operate consistent with an Ethernet protocol.

3. The computer-readable medium of claim 1, wherein the receiver link partner comprises a network interface controller (NIC) and the NIC is to operate consistent with an Ethernet protocol.

4. The computer-readable medium of claim 1, wherein to cease transmission of one or more data packets by the transmitter to the receiver link partner based, at least in part, on the first time duration, the machine is to buffer one or more data packets that are to be transmitted to the receiver link partner.

5. The computer-readable medium of claim 1, wherein the receiver link partner is in a low power mode during at least part of the first time duration.

6. The computer-readable medium of claim 1, wherein the first time duration is based, at least, in part on a level of buffer space available to buffer data packets prior to transmission to the receiver link partner.

7. The computer-readable medium of claim 1, wherein the second time duration comprises a delay before the transmitter is to transmit the one or more data packets to the receiver link partner.

8. The computer-readable medium of claim 1, wherein the cease transmission of one or more data packets by the transmitter to the receiver link partner based, at least in part, on the first time duration comprises cease transmission, for the first time duration, of one or more data packets by the transmitter to the receiver link partner.

9. The computer-readable medium of claim 1, wherein the one or more data packets permitted to be transmitted to the receiver link partner includes at least one of the one or more data packets for which transmission was ceased.

10. The computer-readable medium of claim 1, wherein the wake signal is to cause one or more processors, circuitry, and/or network interface controller (NIC) to transition into a higher power consumption state.

11. A network interface controller (NIC) comprising:
circuitry to determine a system parameter of a first time duration, wherein
the system parameter of the first time duration is indicative of an amount of time that the NIC is to not transmit a data packet to a receiver link partner;
circuitry to disallow transmission of one or more data packets by the NIC to the receiver link partner based, at least in part, on the first time duration;
circuitry to cause transmission of a wake signal by the NIC to the receiver link partner; and
circuitry to, after a second time duration and after the transmission of the wake signal, permit the NIC to transmit one or more data packets to the receiver link partner.

12. The network interface controller of claim 11, wherein the NIC is to operate consistent with an Ethernet protocol.

13. The network interface controller of claim 11, wherein the receiver link partner comprises a second NIC and the second NIC is to operate consistent with an Ethernet protocol.

14. The network interface controller of claim 11, wherein to disallow transmission of one or more data packets by the NIC to the receiver link partner based, at least in part, on the first time duration, the NIC is to buffer one or more data packets that are to be transmitted to the receiver link partner.

15. The network interface controller of claim 11, wherein the receiver link partner is in a low power mode during at least part of the first time duration.

16. The network interface controller of claim 11, wherein the first time duration is based, at least, in part on a level of buffer space available to buffer data packets prior to transmission to the receiver link partner.

17. The network interface controller of claim 11, wherein the second time duration comprises a delay before the NIC is to transmit the one or more data packets to the receiver link partner.

18. A method comprising:
determining a first time duration, wherein the first time duration is indicative of an amount of time that a transmitter is to not transmit a data packet to a receiver link partner;
delaying transmission of one or more data packets by the transmitter to the receiver link partner based, at least in part, on the first time duration;
causing transmission of a wake signal by the transmitter to the receiver link partner; and
after a second time duration and after the transmission of the wake signal, permitting the transmitter to transmit one or more data packets to the receiver link partner.

19. The method of claim 18, wherein the transmitter comprises a network interface controller (NIC) and the NIC is to operate consistent with an Ethernet protocol.

20. The method of claim 18, wherein the receiver link partner comprises a network interface controller (NIC) and the NIC is to operate consistent with an Ethernet protocol.

21. The method of claim 18, wherein delaying transmission of one or more data packets by the transmitter to the receiver link partner based, at least in part, on the first time duration comprises buffering one or more data packets that are to be transmitted to the receiver link partner.

22. The method of claim 18, wherein the receiver link partner is in a low power mode during at least part of the first time duration.

23. The method of claim 18, wherein the first time duration is based, at least, in part on a level of buffer space available to buffer data packets prior to transmission to the receiver link partner.

24. The method of claim 18, wherein the second time duration comprises a delay before transmitting the one or more data packets to the receiver link partner.

* * * * *